US012548838B2

United States Patent
Kim et al.

(10) Patent No.: US 12,548,838 B2
(45) Date of Patent: Feb. 10, 2026

(54) BATTERY CELL TRAY AND STORAGE CONTAINER FOR SAME

(71) Applicant: LG Energy Solution, Ltd., Seoul (KR)

(72) Inventors: Hye Jin Kim, Daejeon (KR); Daesik Chung, Daejeon (KR); Woo Young Song, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 789 days.

(21) Appl. No.: 17/785,718

(22) PCT Filed: Aug. 26, 2021

(86) PCT No.: PCT/KR2021/011478
§ 371 (c)(1),
(2) Date: Jun. 15, 2022

(87) PCT Pub. No.: WO2022/114460
PCT Pub. Date: Jun. 2, 2022

(65) Prior Publication Data
US 2023/0070289 A1   Mar. 9, 2023

(30) Foreign Application Priority Data
Nov. 24, 2020 (KR) .................. 10-2020-0158896

(51) Int. Cl.
*H01M 50/242* (2021.01)
*H01M 50/105* (2021.01)
(Continued)

(52) U.S. Cl.
CPC ....... *H01M 50/242* (2021.01); *H01M 50/105* (2021.01); *H01M 50/121* (2021.01); *H01M 50/178* (2021.01); *H01M 50/227* (2021.01); *H01M 50/538* (2021.01); *H01M 50/129* (2021.01)

(58) Field of Classification Search
CPC ............ H01M 50/242; H01M 50/121; H01M 50/227; H01M 50/538; H01M 50/178; H01M 50/105; H01M 50/129
See application file for complete search history.

(56) References Cited

U.S. PATENT DOCUMENTS

| 2013/0029198 A1 | 1/2013 | Suzuki |
| 2016/0043401 A1 | 2/2016 | Yamaguchi et al. |
| 2016/0276636 A1 | 9/2016 | Kim et al. |

FOREIGN PATENT DOCUMENTS

| CN | 210149792 U | 3/2020 | |
| JP | 2009-140786 A * | 6/2009 | ............ H01M 10/50 |

(Continued)

OTHER PUBLICATIONS

Machine-generated translation of JP 2009-140786) Goto et al, "On-Board Battery Pack", Jun. 25, 2009.*
(Continued)

*Primary Examiner* — Raymond Alejandro
(74) *Attorney, Agent, or Firm* — Lerner David LLP

(57) ABSTRACT

A cell tray that transports a battery cell that is pressed and fixed by a lower plate and an upper plate includes a cell tray bottom part defining a recessed part corresponding to the lower plate, and an edge part protruding from the cell tray bottom part and located outward of the recessed part. The lower plate is positioned on the recessed part.

9 Claims, 7 Drawing Sheets

(51) Int. Cl.
 *H01M 50/121* (2021.01)
 *H01M 50/178* (2021.01)
 *H01M 50/227* (2021.01)
 *H01M 50/538* (2021.01)
 *H01M 50/129* (2021.01)

(56) References Cited

FOREIGN PATENT DOCUMENTS

| | | | |
|---|---|---|---|
| JP | 2011243442 | A | 12/2011 |
| JP | 2012256542 | A | 12/2012 |
| JP | 2018015977 | A | 2/2018 |
| JP | 2019046533 | A | 3/2019 |
| KR | 20120009661 | A | 2/2012 |
| KR | 20160034553 | A | 3/2016 |
| KR | 20160113079 | A | 9/2016 |
| KR | 101788364 | B1 | 10/2017 |
| KR | 2018-0069254 | A | 6/2018 |
| KR | 2018-0081357 | A | 7/2018 |
| KR | 20190029927 | A | 3/2019 |
| KR | 102074051 | B1 | 2/2020 |
| KR | 102124107 | B1 | 6/2020 |

OTHER PUBLICATIONS

International Search Report for PCT/KR2021/011478 dated Dec. 3, 2021. 3 pgs.
Extended European Search Report including Written Opinion for Application No. 21898287.4 dated Apr. 29, 2024. 9 pgs.

\* cited by examiner

【FIG. 1】
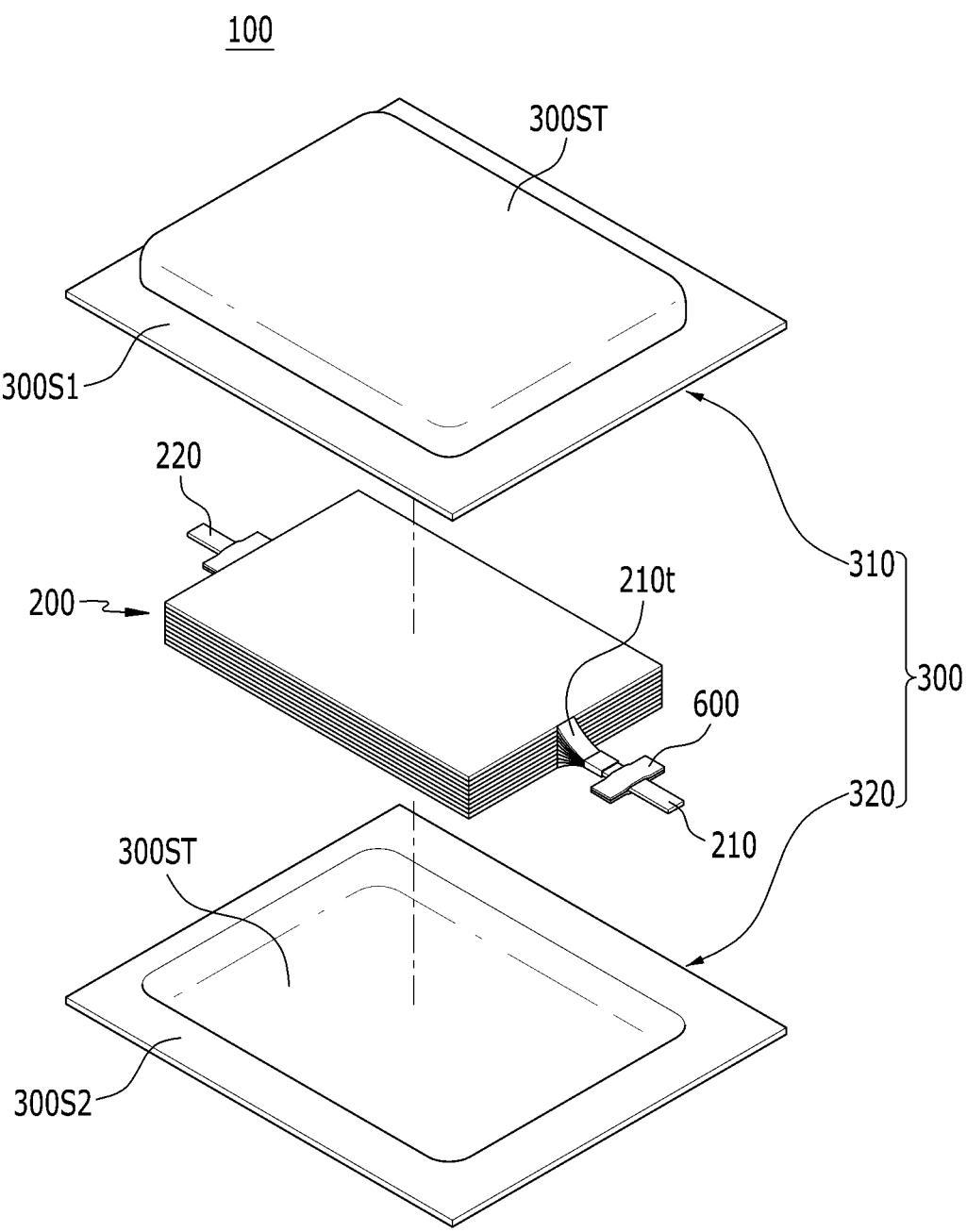

[FIG. 2]
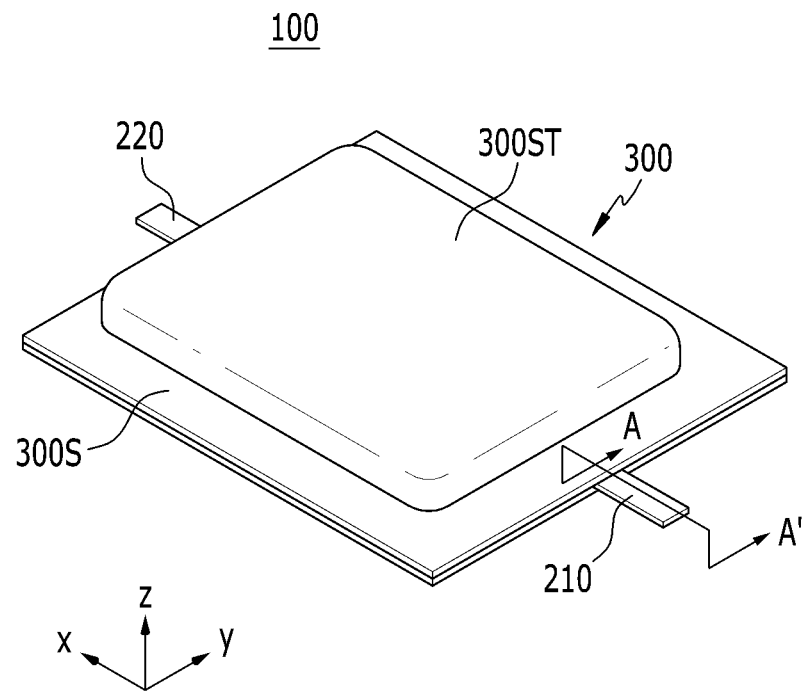
[FIG. 3]
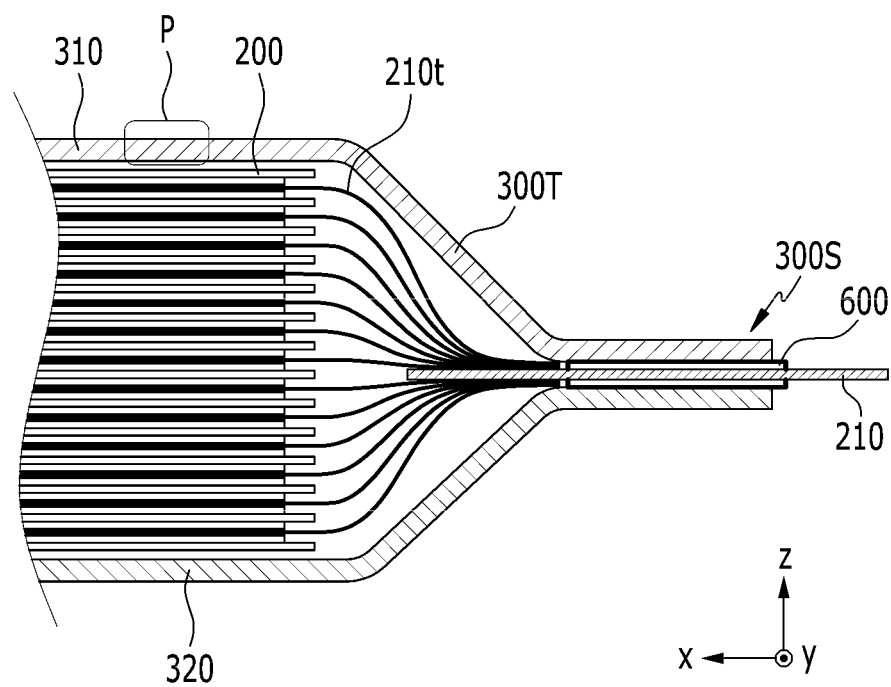

【FIG. 4】
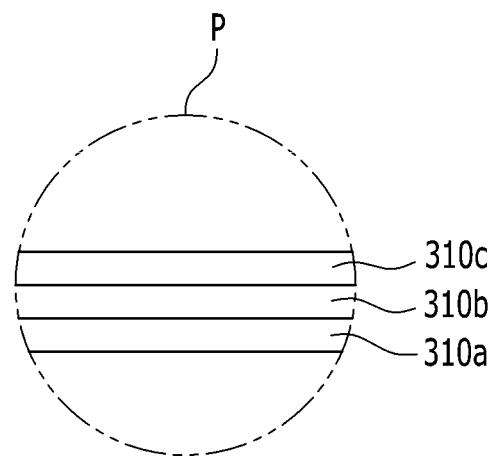
【FIG. 5】
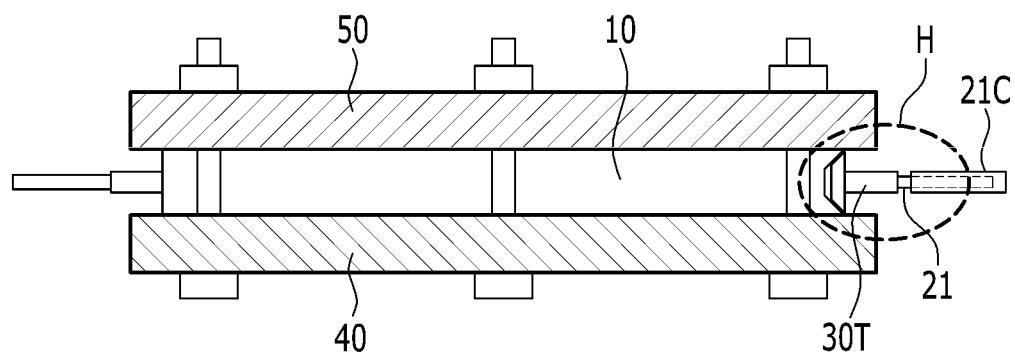

[FIG. 6]
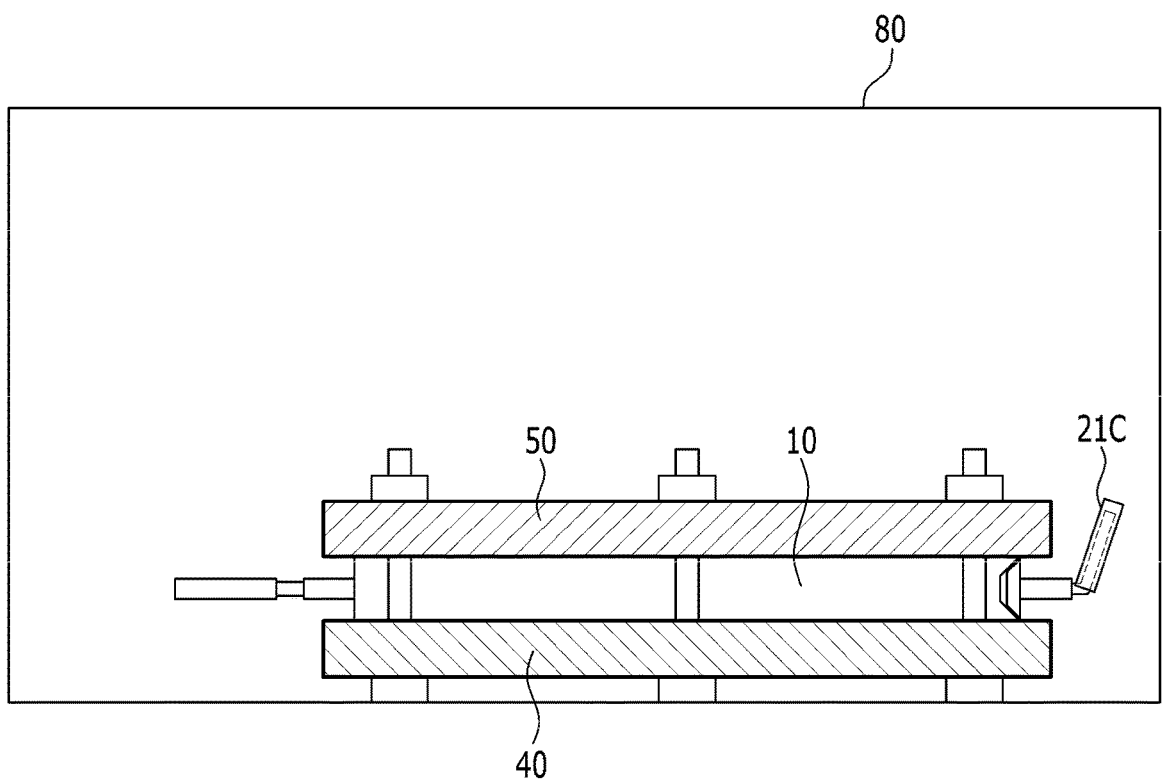

[FIG. 7]
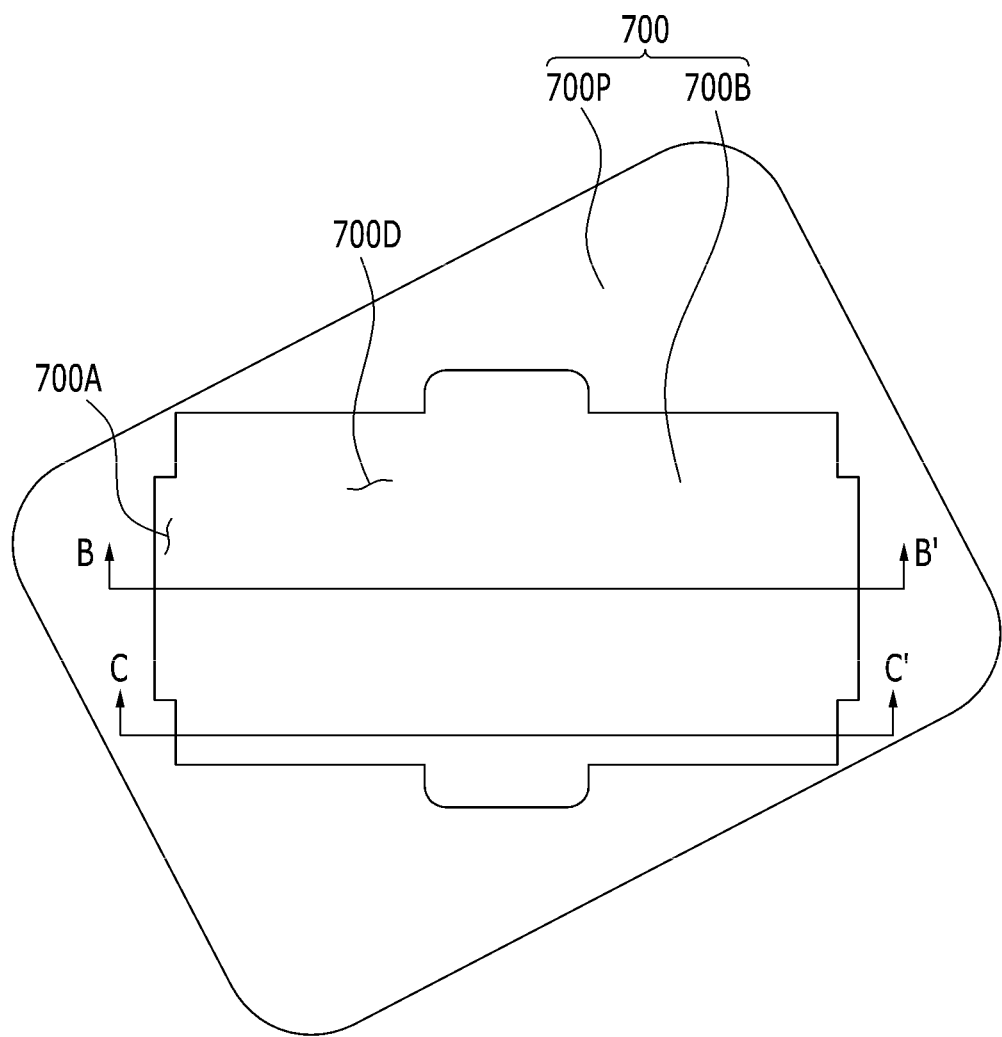

[FIG. 8]
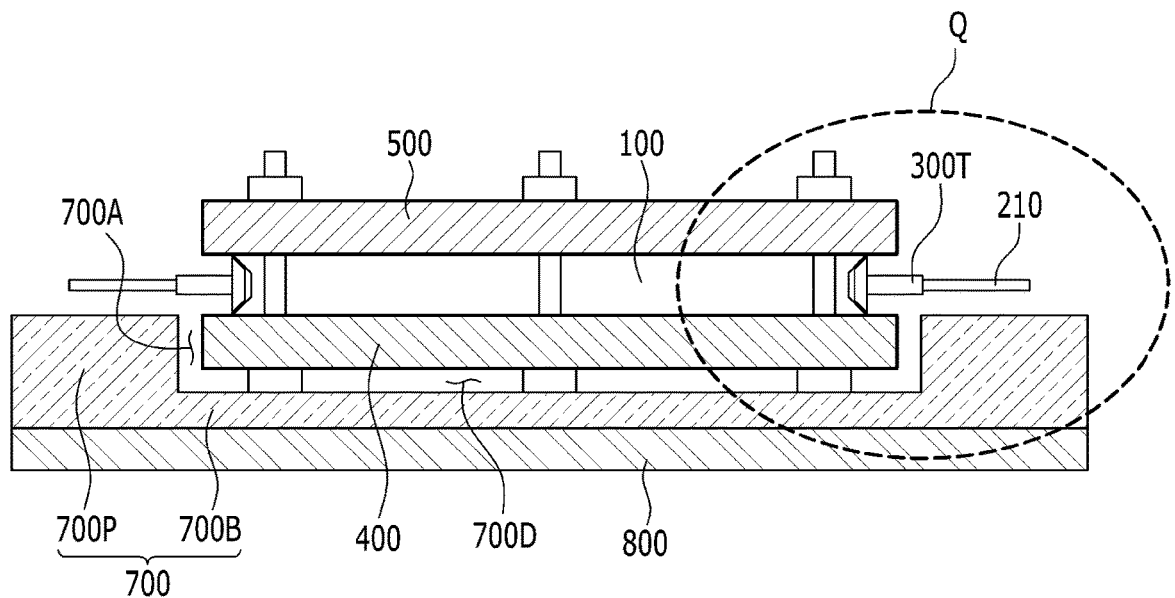
[FIG. 9]
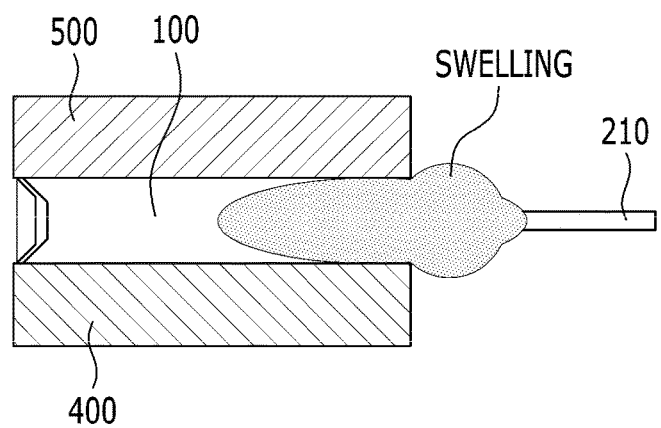

【FIG. 10】
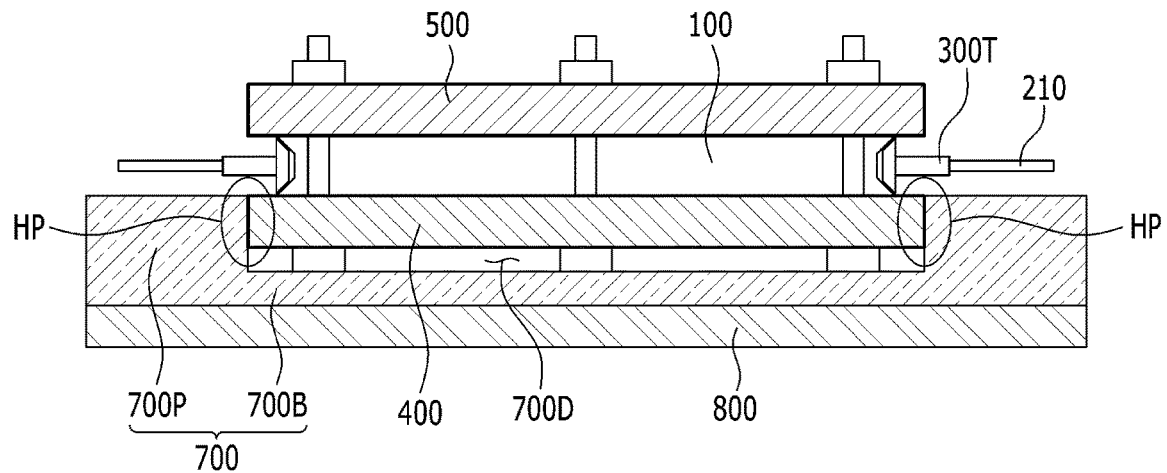
【FIG. 11】
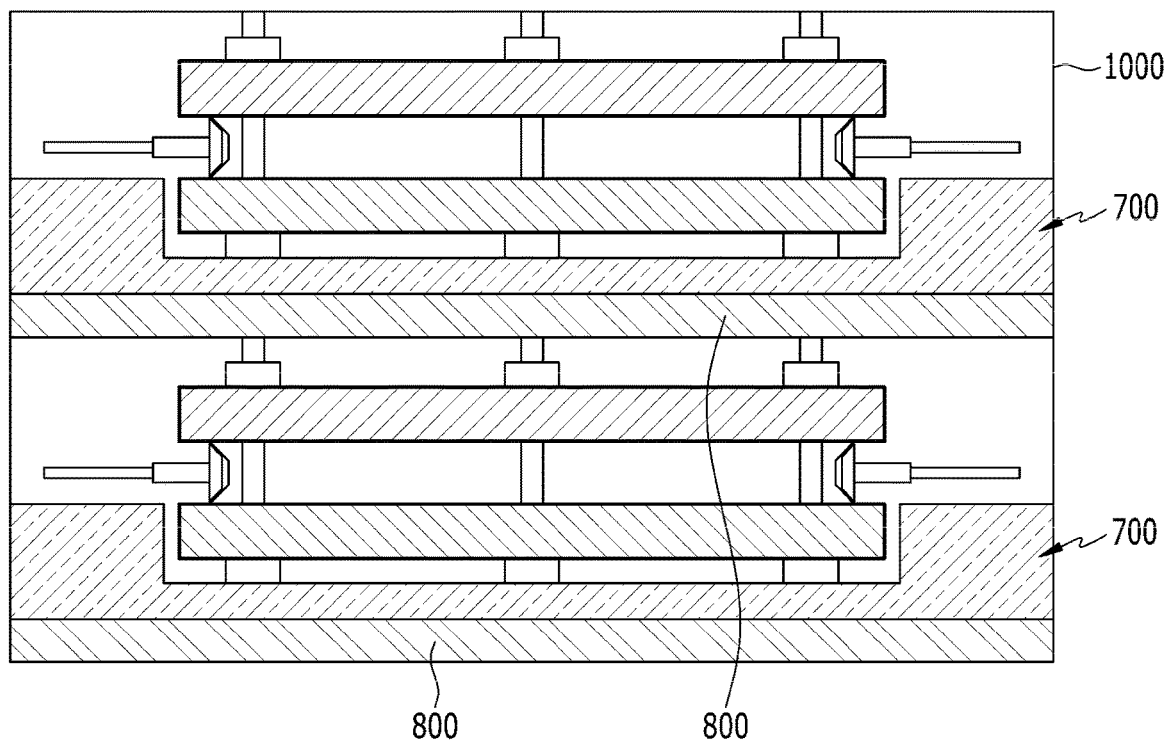

BATTERY CELL TRAY AND STORAGE CONTAINER FOR SAME

CROSS CITATION WITH RELATED APPLICATION(S)

This application claims the benefit of Korean Patent Application No. 10-2020-0158896 filed on Nov. 24, 2020 with the Korean Intellectual Property Office, the disclosure of which is incorporated herein by reference in its entirety.

TECHNICAL FIELD

The present disclosure relates to a cell tray and a storage container containing the same, and more particularly to a cell tray and a storage container having improved safety.

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, the demand for the lithium secondary battery, such as a lithium ion battery or a lithium ion polymer battery, which have advantages such as a high energy density, a discharge voltage, an output stability, and the like is high.

Based on the shape of a battery case, such a secondary battery is classified into a cylindrical battery where an electrode assembly is built into a cylindrical metal can, a prismatic battery where an electrode assembly is built into a prismatic metal can, and a pouch-type battery where an electrode assembly is built into a pouch-type case formed of an aluminum laminate sheet.

In a pouch-type secondary battery, a foil, which is a connection part, exists between an electrode and an electrode lead, and the foil is wrapped in a terrace part, which is an extension part of the cell case. The terrace part may be formed of a flexible material. Therefore, if the electrode lead part receives a force during movement of the battery cell, the relatively weak foil part is bent, which may lead to a disconnection.

DETAILED DESCRIPTION OF THE INVENTION

Technical Problem

It is an object of the present disclosure to provide a cell tray and a storage container having improved safety.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a cell tray that transports a pouch-type battery cell that is pressed and fixed by a lower plate and an upper plate, the cell tray comprising: a cell tray bottom part in which a recessed part corresponding to the lower plate is formed, and an edge part protruding on the cell tray bottom part and located around the recessed part, wherein the lower plate is mounted onto the recessed part.

The lower plate may be hooked on the edge part to fix the battery cell.

An electrode lead protruding from the pouch-type battery cell is disposed on the edge part, and the edge part may be formed of an insulating material.

The insulating material may comprise a styrofoam material.

The pouch-type battery cell comprises an electrode assembly, a cell case for housing the electrode assembly, and a terrace part for covering a plurality of foils connected to the electrode assembly and extending from the cell case, wherein the electrode lead protrudes from the end part of the terrace part, and an additional recessed part is formed in a portion corresponding to the terrace part.

The additional recessed part may protrude more than the recessed part in a direction in which the electrode leads protrude.

According to another embodiment of the present disclosure, there is provided a storage container that stores the above-mentioned cell tray.

The storage container further comprises a reinforcing plate located at the lower end of the cell tray, wherein the reinforcing plate may have a stronger strength than a material forming the cell tray.

The reinforcing plate may be formed of a plastic material.

An area of the bottom part of the storage container may be the same as an area of the bottom part of the cell tray.

Advantageous Effects

According to embodiments of the present disclosure, a recessed part is formed in the cell tray so that the battery cell mounted therein do not shake, and thus the battery cell can be stably fixed when transporting the battery cell.

Also, an additional recessed part is formed in a portion corresponding to the terrace part, which is an extension part of the cell case, whereby the cell terrace is swollen when gas is generated due to the deterioration of the battery cell, so that the external appearance of the battery cell is not damaged by the cell tray.

In addition, a plate having a strength different from that of the material forming the cell tray is put to the lower end of the cell tray, and thus a plurality of cell trays can be stably stacked in a storage container and the battery cells can be safely transported.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view showing a pouch-type battery cell according to an embodiment of the present disclosure;

FIG. 2 is a perspective view showing a state where the pouch-type battery cell of FIG. 1 is assembled;

FIG. 3 is a cross-sectional view taken along the cutting line A-A' of FIG. 2;

FIG. 4 is an enlarged cross-sectional view of a region P of FIG. 3;

FIG. 5 is a diagram showing a battery cell storage method according to a comparative example of the present disclosure;

FIG. 6 is a diagram illustrating a problem that occurs when the battery cell of FIG. 5 is placed in a storage container and moved;

FIG. 7 is a diagram showing a cell tray according to an embodiment of the present disclosure;

FIG. 8 is a cross-sectional view taken along the cut line B-B' of FIG. 7 in a state in which the battery cells are mounted onto the cell tray of FIG. 7;

FIG. 9 is a diagram showing a phenomenon in which a terrace part swells in the region Q of FIG. 8 when the battery cell of FIG. 8 deteriorates and gas is generated;

FIG. 10 is a cross-sectional view taken along the cut line C-C' of FIG. 7 in a state in which the battery cells are mounted onto the cell tray of FIG. 7; and FIG. 11 is a diagram showing a storage container according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is an exploded perspective view showing a pouch-type battery cell according to an embodiment of the present disclosure. FIG. 2 is a perspective view showing a state where the pouch-type battery cell of FIG. 1 is assembled. FIG. 3 is a cross-sectional view taken along the cutting line A-A' of FIG. 2. FIG. 4 is an enlarged cross-sectional view of a region P of FIG. 3.

Referring to FIGS. 1 to 3, the pouch-type battery cell 100 according to the present embodiment may be manufactured by housing the electrode assembly 200 in the cell case 300 and then sealing the case. The electrode assembly 200 may include a positive electrode, a negative electrode, and a separator disposed between the positive electrode and the negative electrode. The electrode assembly 200 may be a stack type electrode assembly, a jelly-roll type electrode assembly, or a stack/folding type electrode assembly.

Each of the positive electrode and the negative electrode includes an electrode tab 210t, and the electrode leads 210 and 220 each connected to the electrode tab 210t may be exposed to the outside of the pouch case 300. The electrode tab 210t may be formed by extending a foil of an electrode sheet included in the electrode assembly 200. In addition, the electrode leads 210 and 220 can be located respectively in the sealing part 300S in a state of being covered with a lead film 600 so as to secure a sealing property and an insulation property.

The cell case 300 is composed of a laminate sheet, and may include a resin layer for heat fusion and a metal layer for preventing material penetration. The cell case 300 may include an upper case 310 and a lower case 320.

Specifically, referring to FIG. 4, the upper case 310 may include an inner resin layer 310a for sealing, a metal layer 310b for preventing material penetration, and an outer resin layer 310c.

The layer structure concerning the upper case 310 described above may be equally applied even to a lower case 320. In other words, the lower case 320 may include an inner resin layer, a metal layer and an outer resin layer along a direction away from the electrode assembly 200.

The outer resin layer 310c and the packaging sheet layer may have excellent tensile strength and weather resistance compared to their thickness and have electrical insulation property in order to protect the pouch-type secondary battery 100 from the outside. The outer resin layer 310c may include a polyethylene terephthalate (PET) resin or a nylon resin. The metal layer 310b may prevent air, moisture and the like from flowing into the pouch-type battery layer 100. The metal layer 310b may include aluminum (Al). The inner resin layer 310a may be heat-fused to each other by heat and pressure applied in a state where the electrode assembly 200 is built-in. The inner resin layer 310a may include casted polypropylene (CPP) or polypropylene (PP).

Referring back to FIGS. 1 to 3, a recessed housing part 300ST on which the electrode assembly 200 can be seated may be formed in each of the upper case 310 and the lower case 320. Sealing parts 300S1 and 300S2 may be provided along the outer periphery of the housing part 300ST for each of the upper case 310 and the lower case 320. The sealing part 300S1 of the upper case 310 and the sealing part 300S2 of the lower case 320 can be heat-fused to each other to form the sealing part 300S and seal the pouch case 300.

In another embodiment of the present disclosure, one side of the upper case and one side of the lower case can be integrally connected to each other, and the remaining three sides can be heat-fused.

On the other hand, each of the plurality of positive electrodes and the plurality of negative electrodes included in the electrode assembly 200 may include a positive electrode tab and a negative electrode tab, to which electrode leads 210 and 220 are connected. Specifically, one of the electrode leads 210 and 220 may be a positive electrode lead, and the other may be a negative electrode lead. As described above, one of the electrode leads 210 and 220 connected to the electrode assembly 200 can protrude from one end part of the pouch case 300 and be exposed to the outside of the pouch case 300, and the other of the electrode leads 210 and 220 can protrude from the other one end part of the cell case 300 and be exposed to the outside of the cell case 300. Specifically, the pouch-type battery cell 100 may include an electrode assembly 200, a cell case 300 for housing the electrode assembly 200, and a terrace part 300T that covers the plurality of electrode tabs 210t connected to the electrode assembly 200 and extends from the cell case 300. The electrode lead 210 may be protruded from the end part of the terrace part 300T.

In the present embodiment, the bidirectional electrode leads 210 and 220 have been described, but the electrode leads 210 and 220 may be protruded in one direction.

FIG. 5 is a diagram showing a battery cell storage method according to a comparative example of the present disclosure. FIG. 6 is a diagram illustrating a problem that occurs when the battery cell of FIG. 5 is placed in a storage container and moved.

Referring to FIG. 5, in the comparative example, in a state where the battery cell 10 is pressed and fixed by the lower plate 40 and the upper plate 50, both side leads can be covered with a protective cap 21 made of a plastic material in consideration of the insulation function during transportation. Next, referring to FIG. 6, the battery cell 10 pressed and fixed by the lower plate 40 and the upper plate 50 is placed in the storage container 80 and transferred, but the battery cell 10 is shaken in the process of transporting. At this time, as shown in FIG. 6, in the region H of FIG. 5, the electrode lead 21 covered with the protective cap 21 located at one end of the battery cell 10 and the electrode tab in the terrace part 30T connected to the electrode lead 21, that is, the foil, may be bent and disconnection may occur. When the disconnection occurs, the capacity of the battery cell 10 may be reduced.

FIG. 7 is a diagram showing a cell tray according to an embodiment of the present disclosure. FIG. 8 is a cross-sectional view taken along the cut line B-B' of FIG. 7 in a state in which the battery cells are mounted onto the cell tray of FIG. 7.

Referring to FIGS. 7 and 8, the cell tray 700 according to the present embodiment may transport the pouch-type battery cell 100 pressed and fixed by the lower plate 400 and the upper plate 500. The cell tray 700 may be formed of an insulating material such as rigid styrofoam. At this time, the cell tray 700 includes a cell tray bottom part 700B in which the recessed part 700D corresponding to the lower plate 400 is formed, and an edge part 700P that protrudes on the cell tray bottom part 700B and is located on the main surface of the recessed part 700D. The lower plate 400 is mounted onto the recessed part 700D. At this time, the height of the recessed part 700D may be the same as the height of the lower plate 400.

An electrode lead 210 protruding from the pouch-type battery cell 100 may be disposed on the edge part 700P according to the present embodiment. The edge part 700P may be formed of an insulating material. The insulating material may include a styrofoam material.

A reinforcing plate 800 may be formed at the lower end of the cell tray bottom part 700B. This will be described later.

FIG. 9 is a diagram showing a phenomenon in which a terrace part swells in the region Q of FIG. 8 when the battery cell of FIG. 8 deteriorates and gas is generated.

Referring to FIGS. 8 and 9, when the battery cell 100 is deteriorated, a phenomenon in which the terrace part 300T swells may occur and the exterior appearance of the battery cell 100 may change. As shown in FIG. 10 described later, if only the recessed part 700D that fits the cell tray 700 is formed, the terrace part 300T is pushed by the cell tray 700 when swelling the terrace part 300T, the electrode lead 210 may be lifted up and the internal foil may be damaged. In addition, interference occurs between the upper plate 500 and the battery cell 100, which may cause damage to the external pouch. In order to prevent damage to the battery cell 100 due to such appearance deformation, according to this embodiment, an additional recessed part 700A may be formed in the cell tray 700 at a portion corresponding to the terrace part 300T as shown in FIGS. 7 and 8. The additional recessed part 700A may protrude more than the recessed part 700D in a direction in which the electrode lead 210 protrudes. At this time, the height of the additional recessed part 700A may be the same as the height of the lower plate 400. Due to such structure, the terrace part 300T may not touch the cell tray 700.

FIG. 10 is a cross-sectional view taken along the cut line C-C' of FIG. 7 in a state in which the battery cells are mounted onto the cell tray of FIG. 7.

Referring to FIG. 10, a hooking part HP may be formed in the cell tray 700 so that the lower plate 400 is hooked on the edge part 700P and the battery cell 100 is fixed. The length of the lower plate 400 in the direction in which the electrode lead 210 protrudes is formed so as to be substantially the same as the length of the recessed part, and thus, the hooking part HP can be formed.

FIG. 11 is a diagram showing a storage container according to another embodiment of the present disclosure.

Referring to FIG. 11, the storage container 1000 according to the present embodiment may store at least one cell tray 700. Further, the stored cell tray 700 may be transferred to a desired location.

The storage container 1000 may further include a reinforcing plate 800 located at the lower end of the cell tray 700. The reinforcing plate 800 may have a stronger strength than the material forming the cell tray 700. In one example, the reinforcing plate 800 may be formed of a plastic material. The reinforcing plate 800 is formed at the lower end of the cell tray 700, the stacked structure can be stably maintained in the storage container 1000 even when a plurality of cell trays 700 are stacked.

According to the present embodiment, the area of the bottom part of the storage container 1000 may be the same as the area of the bottom part of the cell tray 700.

Although preferred embodiments of the present disclosure have been described above, the scope of the present disclosure is not limited thereto, and numerous other variations and modifications can be made by those skilled in the art using the principles of the invention defined in the appended claims, which also fall within the spirit and scope of the present disclosure.

DESCRIPTION OF REFERENCE NUMERALS

100: battery cell
300: cell case
300T: terrace part
400: lower plate
500: upper plate

700: cell tray
700D: recessed part
700A: additional recessed part
700B: cell tray bottom part
700P: edge part
800: reinforcing plate
1000: storage container

The invention claimed is:

1. A cell tray that transports a battery cell that is fixed by a lower plate and an upper plate, the cell tray comprising:
    a cell tray bottom part defining a recessed part corresponding to the lower plate, and
    an edge part protruding from the cell tray bottom part and located outward of the recessed part,
    wherein the lower plate is positioned on the recessed part, and
    wherein the battery cell comprises:
        an electrode assembly,
        a cell case for housing the electrode assembly, and
        a terrace part configured to cover a plurality of foils connected to the electrode assembly and extending from the cell case,
        wherein an electrode lead protrudes from an end part of the terrace part, and
        an additional recessed part is formed in a portion corresponding to the terrace part.

2. The cell tray according to claim 1, wherein:
    the lower plate is hooked on the edge part to fix the battery cell.

3. The cell tray according to claim 1, wherein:
    the electrode lead protruding from the battery cell is disposed on the edge part, and
    the edge part is formed of an insulating material.

4. The cell tray according to claim 3, wherein:
    the insulating material comprises a styrofoam material.

5. The cell tray according to claim 1, wherein:
    the additional recessed part protrudes more than the recessed part in a direction in which the electrode leads protrude.

6. A storage container that stores the cell tray according to claim 1.

7. The storage container according to claim 6,
    which further comprises a reinforcing plate positioned on the cell tray on a side of the cell tray opposite the battery cell,
    wherein the reinforcing plate has a stronger strength than a material forming the cell tray.

8. The storage container according to claim 7, wherein:
    the reinforcing plate is formed of a plastic material.

9. The storage container according to claim 6, wherein:
    an area of the bottom part of the storage container is substantially the same as an area of the bottom part of the cell tray.

* * * * *